Feb. 19, 1957 W. F. BERCK 2,781,997
BALANCED SHUT-OFF VALVE
Filed Dec. 6, 1952 2 Sheets-Sheet 1
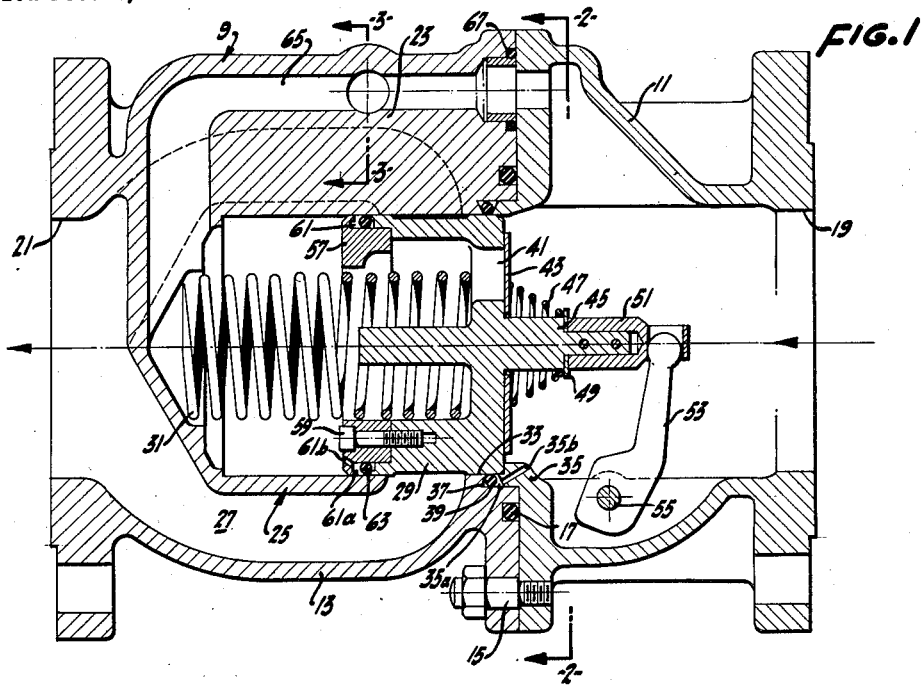
FIG. 1
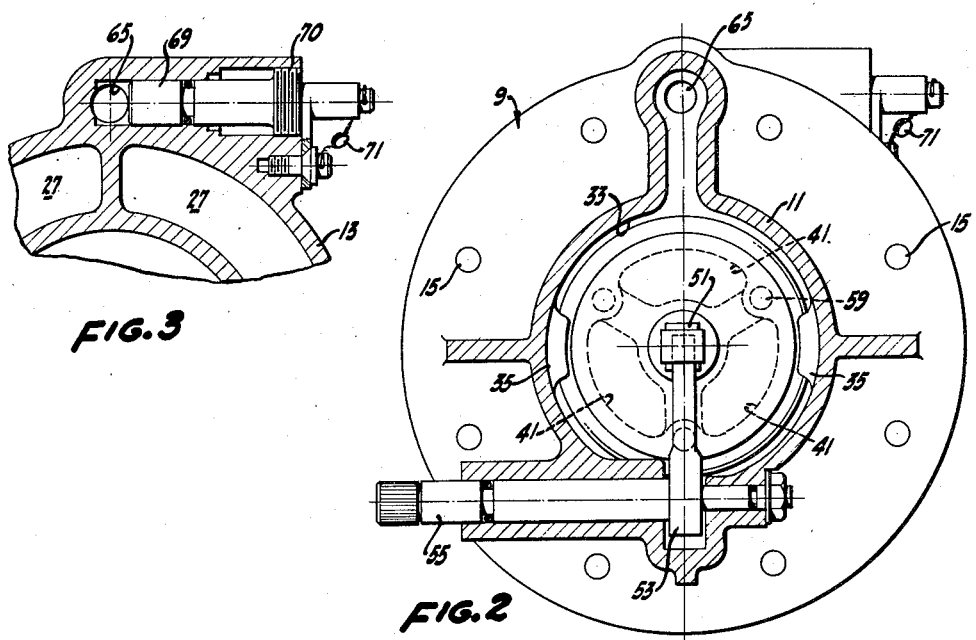
FIG. 3
FIG. 2
INVENTOR.
WILLIAM F. BERCK
BY
Mellin and Hanscom
ATTORNEYS Feb. 19, 1957  W. F. BERCK  2,781,997
BALANCED SHUT-OFF VALVE
Filed Dec. 6, 1952  2 Sheets-Sheet 2

INVENTOR.
WILLIAM F. BERCK
BY
Mellin and Hanscom
ATTORNEYS

United States Patent Office 2,781,997
Patented Feb. 19, 1957

2,781,997

BALANCED SHUT-OFF VALVE

William F. Berck, Hayward, Calif., assignor to Ralph N. Brodie Company, San Leandro, Calif., a corporation of California Application December 6, 1952, Serial No. 324,501

6 Claims. (Cl. 251—51)

This invention relates to a valve, and particularly to a balanced pressure valve of the sleeve-closure type. The present application is a continuation in part of my copending application entitled "Balanced Shut-Off Valve," filed October 20, 1951, and bearing Serial No. 252,248, now abandoned.

Prior balanced pressure valves of the sleeve-closure type have uniformly utilized a sleeve closure open to the outlet end of the valve. This construction has resulted in objectionable operating conditions in the valve, particularly when the valve is incorporated in a measuring or regulating system having a relatively delicate valve control mechanism, and particularly in a system where it is desired to move the valve relatively quickly from closed to open position and then to move the valve in a step-by-step fashion from open to closed position to avoid water hammer and also foaming which may occur when measuring various types of liquid.

The main objectionable operating conditions are as follows: In the above construction, a partial vacuum is drawn at a partially closed position of the valve, therefore interfering with the final closing movement of the valve. Also, since the sleeve closure is open to the outlet end of the valve, difficulty is encountered in obtaining a consistent dash-pot action necessary for proper closing of the valve, because the sleeve closure is sometimes filled with air and sometimes liquid, creating varying operating conditions accordingly affecting the dash-pot action of the valve. Further, friction of the liquid stream passing at high velocity over the surface of the piston when opening the valve, causes the valve to chatter, which results in violent shock waves being set up.

A main object of the present invention is to provide a valve overcoming the above objections, and which valve, though not being restricted to, is particularly adapted for use in a measuring or regulating system having a relatively delicate control mechanism for bringing the valve from an open to a closed position in a step-by-step fashion, to thereby avoid the detrimental effects of water hammer, and also foaming-over encountered when measuring and regulating certain liquids.

The present invention overcomes the above objections by providing a tubular closure in the form of a piston open only to the inlet end of the valve instead of the outlet end. With this arrangement, no partial vacuum is drawn at a partially closed position of the valve, since the liquid does not flow in a direction to create a vacuum; also, a consistent dash-pot action is obtained, since the piston is always filled with liquid from the inlet end; and, furthermore, the objectionable chatter resulting from the friction of the high velocity fluid flowing past the piston is eliminated, since the liquid flows in the reverse direction from the direction in which chatter is created.

Another object of the present invention is to provide a valve as above described which can be quickly opened by providing a pressure-responsive valve in the closed end of the piston, which pressure-responsive valve opens in a direction to allow rapid opening of the valve but closes to retard closing of the valve, and which valve communicates with the inlet end of the valve by means of a relatively restricted passageway.

Another main object of the present invention is to provide a novel sealing arrangement between the piston and the cylinder, which sealing means are so constructed and mounted as to provide an efficient seal, but create only a minimum resistive force to movement of the piston relative to the cylinder.

Various other objects of the present invention will be apparent from the following description taken in connection with the accompanying drawings in which:

Fig. 1 is a longitudinal mid-section through a valve embodying the concepts of the present invention, showing the same in its completely closed position.

Fig. 2 is a vertical cross-sectional view taken generally along line 2—2 of Fig. 1.

Fig. 3 is a fragmentary section taken along line 3—3 of Fig. 1.

Figure 5:
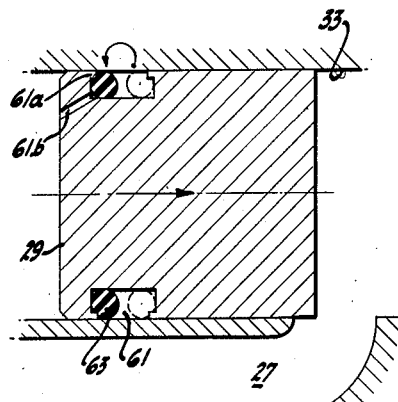
Figure 6:
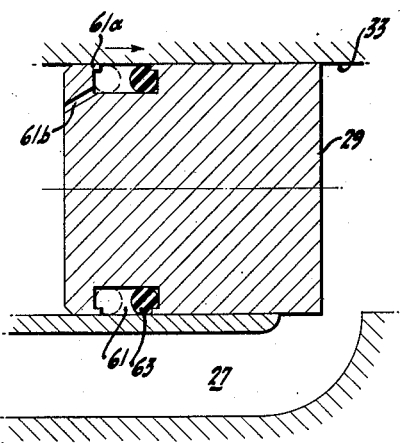
Figure 7:
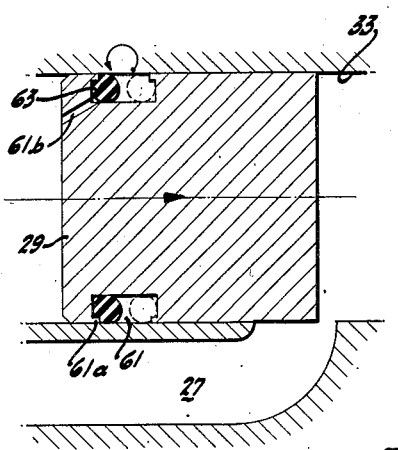
Figure 8:
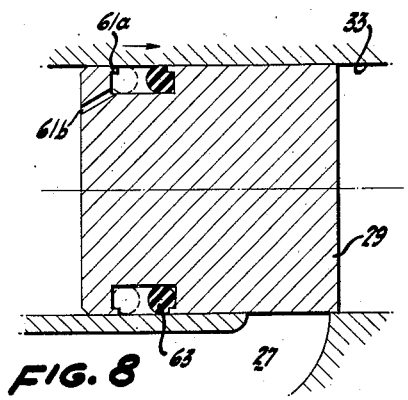

Figs. 5 to 8 are diagrammatic views showing the manner in which the O-ring is moved or shifted during closing movement of the piston, Fig. 5 showing the piston moving toward its throttle position, Fig. 6 showing the piston at its throttle position, Fig. 7 showing the piston moving from its throttle toward its closed position, and Fig. 8 showing the piston just after it has reached its fully closed position.

Referring to the accompanying drawings, wherein similar reference characters designate similar parts throughout, the valve disclosed in the drawings includes a valve body 9 having a forward flanged body portion 11 and a rear flanged body portion 13 bolted together at 15, and provided with a seal 17 therebetween. Forward portion 11 has an inlet formed at 19, and rear body portion 13 has an outlet formed at 21.

Supported within rear body portion 13, by radial annular ribs 23 formed on the rear portion, is a cylinder generally entitled 25, closed at the end thereof adjacent the outlet 21, and open at the end thereof adjacent the inlet 19. As is obvious by a comparison of Figs. 1 and 3, it will be seen that the ribs divide the annular space between cylinder 25 and rear body portion 13 into annular passageways 27.

Slidably fitting within cylinder 25 is a piston 29 opening at its rear end into the cylinder and closed at its forward end. Piston 29 is spring-urged by a light compression spring 31 toward the inlet 19 and the piston is adapted to seat on a circular valve seat 33, formed in rear body portion 13. A stop 35 is formed on the forward body portion 11 and is adapted to limit forward movement of piston 29, when the piston abuts thereagainst. Between the forward body portion 11 and rear body portion 13, there is formed an annular dovetail groove 37, receiving an O-ring 39 for sealingly engaging the exterior of piston 29 when the piston is seated.

The closed end of pistons 29 is apertured at 41, which apertures are normally covered by a pressure-responsive valve 43, formed by a flat disc fitting onto a forwardly extending stem 45 of piston 29. Valve 43 is spring-urged by a light compression spring 47 to seat against the end of piston 29 and close the apertures therein. Spring 47 is retained in compressed condition by a washer 49 held against a shoulder on stem 45 by a cap 51, which cap fits on and is secured to a reduced forward portion of stem 45, as shown in Fig. 1.

Piston 29 is moved from its closed to its opened position by a lever 53, fixed to the inner end of an operating shaft 55, which sealingly extends through forward body portion 11, as shown in Fig. 2, the free end of lever 53 fitting within a slot or recess formed in cap 51. The outer end of operating shaft 55 is fitted with an operating lever (not shown) to permit manual opening. The valve of the present invention is ideally suited for incorporation in systems having a latch mechanism functioning in conjunction with spring 31 to bring the valve step-by-step from an open to a closed position. Such a mechanism is disclosed in the copending application of Alvin Gordon McNeil, filed April 25, 1950, Serial No. 158,009, which issued on August 5, 1952, as Patent No. 2,605,930.

Figure 4:
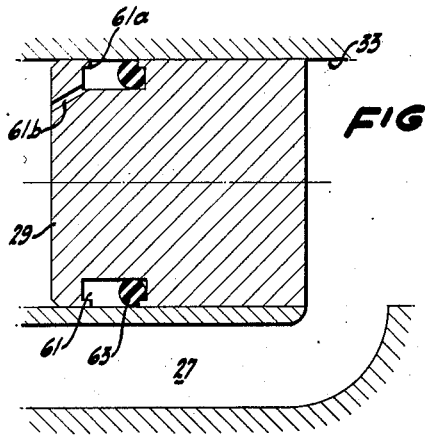
Fig. 4 is a diagrammatic view showing the piston O-ring in the position it occupies when the piston is fully open.

Piston 29 is adapted to sealingly engage the interior of cylinder 25 and to this end, the piston has a separate rear annular portion 57 secured to the main body portion thereof by machine screws 59. The main body portion of piston 29 and separate member 57 are mutually formed to provide an annular groove 61 of generally dovetail configuration but having rounded lips 61a and within which groove there is received an O-ring 63 for sealing engagement with the interior of cylinder 25 and of course the exterior of piston 29. As is apparent from Figs. 1 and 4, the groove is considerably wider than O-ring 63 and there are one or more passageways 61b extending from the bottom of the groove to the left-hand end of the piston for a purpose to be described.

Formed in body portions 11 and 13 is a passageway 65 communicating at its forward end with the interior of forward body portion 11 adjacent inlet 19, and communicating at its rear end with the interior of cylinder 25. A sealing arrangement at 67 around passageway 65 is provided.

Laterally extending into passageway 65 is a valve 69 sealingly extending through body portion 13 and threadedly engaging the body portion at 70 to enable adjustment of the valve to thereby variously restrict the passageway 65 to the flow of fluid therethrough. The valve 69 is adapted to be retained in an adjusted position by a suitable locking arrangement at 71 of conventional construction.

The operation of the valve is as follows: Piston 29 is moved (conventionally by manual operation) from its closed position, shown in Fig. 1, to its open position by the operation of operating shaft 55, the fluid disposed within cylinder 25 and piston 29 and the rear portion of passageway 65 being urged past valve 69 and into the forward body portion 11 but being restricted in such movement by the configuration of the passageway and by the disposition of valve 69. However, as soon as a slight pressure is created in cylinder 25, pressure-responsive valve 43 is unseated to allow the fluid to flow out through the forward end of piston 29 so that the piston can be quickly moved to its open position. During such movement, the frictional engagement of O-ring 63 with cylinder 25 causes the O-ring to remain at the trailing side of the groove.

It is apparent from the above described opening operation that there is no objectionable fluid flow (such as would create chatter) over the exterior surface of the piston 29 since the fluid passing through the valve flows from the right toward the left, as the parts are depicted in Fig. 1, from the interior of body portion 11 to passageways 27 and out through the outlet 21.

If the device is to be manually closed, a suitable operating lever, secured to shaft 55, can thereafter be operated to move the valve toward closed position. At this time, it will be apparent that pressure-responsive valve 43 will be closed by its spring 47 and that the movement of the piston will be retarded in its closing movement because of the dash-pot action created by the resistance to the fluid flow through the passageway 64 to the interior of cylinder 25, so that the valve will be moved slowly to a closed position, avoiding water hammer and other objectionable operating conditions.

However, as previously mentioned, the valve of the present invention is ideally suited to be brought from an open to a closed position in a step-by-step fashion, either from a fully open position to a single intermediate position and then to a closed position, or from an open position to several intermediate positions and then to a closed position.

It is apparent that the movement of the valve from fully open position to partly closed position will be accompanied by a consistent dash-pot action, since the cylinder 25 is open only to the inlet 19 which is filled with liquid and not to the outlet 21 which is usually filled partly with liquid and partly with air. It is pointed out that when the valve is in partly closed position, the liquid flows from the inlet 19 past the closed end of piston 25 and into passageways 27, which liquid flow will not cause the creation of a partial vacuum which would interfere with the final closing of the valve.

Another beneficial effect of applicant's construction is that the impact of the stream of liquid on the closed end of the piston, while of little effect when the piston is first opened, because of the low velocity of the liquid, is of definite benefit as the valve is opened wider, as it aids in overcoming the spring pressure behind the piston. This same impact pressure aids the dash-pot action and controls a smooth, easy closing of the valve, helping to eliminate any sudden shock. At the partially open position of piston 25, the velocity of the liquid stream again becomes quite low so that the impact pressure has no practical effect on the final closure of the valve.

In valves having a balanced piston movable toward closed position in a step-by-step fashion, I have noticed that there has been considerable resistance encountered in initiating movement of the piston after it has undergone one or more steps of closing movement and is about to be moved a further step toward its fully closed position. I have traced this resistance to the operation of the O-ring carried by the piston. When the piston is moved from its fully open position toward its closed position, considerably less resistance is encountered in initiating such movement, since the O-ring undergoes what is termed a "rolling break." The O-ring being disposed in a groove wider than the O-ring, is permitted limited rolling movement, and since the direction of movement of the piston is toward the wall against which the piston is disposed, the O-ring may roll toward the opposite wall. Such a rolling break requires considerably less force than that required in forcing the piston in a direction away from the wall against which the O-ring is disposed. This latter type of movement might be conveniently termed a "dragging break."

It is pointed out that since the piston, during its movement towards closed position, is moved in a direction away from the wall pushing the O-ring along, a dragging break of the O-ring at the beginning of each closing movement (except the first as above described) must be effected unless other forces act to shift the O-ring toward the opposite wall during the halt period of the piston.

Under some conditions of operation, only a light spring (such as spring 31) can be employed to urge the piston toward closed position. A condition for stalling operation of the valve is created if the spring is required to cause a dragging break as contrasted with a rolling break of the O-ring. This is particularly true where the O-ring has a rather tight fit between the piston and cylinder within which the piston fits.

In some prior installations, the light spring was not required to attempt to effect a dragging break of the O-ring because the differential liquid pressure across the O-ring has been sufficient to cause the O-ring to shift from the trailing wall toward the leading wall of the groove and hence be in position to undergo a rolling break at the end of the halt period.

In many installations however, this shifting movement has not occured. There have been several reasons for this. Sometimes the pressures of the line have not been sufficiently high to create the necessary differential force.

Also, the lubricating valve of the liquid being controlled may not be sufficiently high to decrease the frictional force, holding the O-ring in position against the trailing groove wall, to an extent to facilitate a shift under the available differential pressure. Also, due to manufacturers' tolerances, some O-rings fit between the piston and cylinder tighter than others and hence create a higher frictional force holding the O-ring in position against the trailing wall. I have discovered a further condition retarding shifting movement of the O-ring and this wall be now explained.

There is considerable tendency towards extrusion of the O-ring between the piston and cylinder walls, and to lessen this without materially affecting the sealing qualities of the O-ring, inwardly extending lips (such as lips 61a) have been formed on the O-ring, groove. However, each lip provides a recess or pocket, which is closed when the O-ring is disposed against the lip. The trailing pocket is occupied by a liquid under open-line pressure at the time the O-ring undergoes a rolling break (compare Figs. 4 and 5). The O-ring at the end of the rolling break is disposed against the trailing lip and hence closes the pocket thereunder. At the end of the first step of movement (see Fig. 6), the valve throttles the liquid and the throttle pressure created is considerably higher than the open-line pressure. However, this throttle pressure is effective only against the outer annular portion of the trailing side of the O-ring, whereas the inner annular portion of the trailing side is exposed to the relatively low pressure open-line liquid in the pocket. The O-ring may not be shifted toward the leading groove wall because these liquid forces may not be sufficient to overcome the frictional force holding the O-ring against the trailing lip.

Whether a shift will occur depends on the pressures in the line in which the valve is installed, the particular fit of the O-ring between the piston and cylinder, and the lubricating valve of the liquid and possibly other factors. In installations where the above factors are favorable, a shift of the O-ring at its halt condition will occur, but where one or more of the factors are unfavorable, a shift will not occur, and a condition for stalling operation of the valve is created.

In the present invention, the passageway or passageways at 61b allow the throttle pressure to be effective against the entire trailing side of O-ring 63 and hence causes it to shift from its trailing dotted line position in Fig. 6 to its leading solid line position. Thereafter, spring 31 may initiate movement of the piston since O-ring 63 may undergo a rolling break from the dotted line position in Fig. 7 to the solid line position. Fig. 8 shows a subsequent shift of O-ring 63, placing the O-ring improperly for a rolling break. However, since the piston is opened by a considerable force, this is not important.

I have discovered that relatively low pressure liquid (open-line pressure liquid) is trapped behind O-ring 39 at 35a preventing proper sealing action of the O-ring when the piston is moved back to its fully closed position. The situation is corrected by providing one or more passages 35b to communicate closed line pressure with space 35a and therefore permit proper sealing action of O-ring 39.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A valve, comprising a valve body having an inlet and an outlet, a cylinder suspended within, in annular-spaced relation with respect to, and by the valve body, said cylinder having an open end opening toward and coaxial with the inlet and a blind end facing the outlet, a piston slidably fitting within the cylinder, said valve body having formed therein a circular valve seat axially spaced from the open end of and of the same diameter as the cylinder and disposed axially inwardly of the inlet of the valve body and adapted to slidably receive the piston to engage said seat, and means for moving the piston from closed to open position and from open to closed position, said piston being open at the end thereof adjacent the blind end of the cylinder and being closed at the end thereof closest the valve seat, and having an outwardly opening pressure-responsive valve in the closed end thereof, and a restricted passageway formed in the walls of the valve body communicating at one end with the interior of the cylinder and at its opposite end with the interior of the valve body at a point between the valve seat and the inlet.

2. A valve, comprising a valve body having an inlet and an outlet, a cylinder suspended within, in annular-spaced relation with respect to, and by the valve body, said cylinder having an open end opening toward and coaxial with the inlet and a blind end facing the outlet, a piston slidably fitting within the cylinder, said valve body having formed therein a circular valve seat axially spaced from the open end of and of the same diameter as the cylinder and disposed axially inwardly of the inlet of the valve body and adapted to slidably receive the piston to engage said seat, means for moving the piston from closed to open position and vice versa, said piston being open at the end adjacent the blind end of the cylinder and being closed at the end thereof closest the valve seat and having an outwardly opening pressure-responsive valve in the closed end thereof, and a passageway formed in the walls of the valve body and communicating at one end with the interior of the cylinder and at its opposite end with the interior of the valve body at a point between the valve seat and the inlet, and a valve in the passageway for regulating the flow of fluid therethrough.

3. A valve, comprising a valve body having an inlet and an outlet, a cylinder suspended within, in annular-spaced relation with respect to, and by the valve body, said cylinder having an open end opening toward and coaxial with the inlet and a blind end facing the outlet, a piston slidably fitting within the cylinder, said valve body having formed therein a circular valve seat axially spaced from the open end of and of the same diameter as the cylinder and disposed axially inwardly of the inlet of the valve body and adapted to slidably receive the piston to engage said seat, means for moving the piston from closed to open position and vice versa, said piston being open at the end adjacent the blind end of the cylinder and being closed at the end thereof closest the valve seat and having an outwardly opening pressure-responsive valve in the closed end thereof, and a passageway formed in the walls of the valve body and communicating at one end with the interior of the cylinder and at its opposite end with the interior of the valve body at a point between the valve seat and the inlet, said piston adjacent its open end having an annular T-shaped groove formed therein receiving an O-ring for sealing against the cylinder.

4. A valve, comprising a valve body having an inlet and an outlet, a cylinder suspended within, in annular-spaced relation with respect to, and by the valve body, said cylinder having an open end opening toward and coaxial with the inlet and a blind end facing the outlet, a piston slidably fitting within the cylinder, said valve body having formed therein a circular valve seat axially spaced from the open end of and of the same diameter as the cylinder and disposed axially inwardly of the inlet of the valve body and adapted to slidably receive the piston to engage said seat, means for moving the piston from closed to open position and vice versa, said piston being open at the end adjacent the blind end of the cylinder and being closed at the end thereof closest the valve seat and having an outwardly opening pressure-responsive valve in the closed end thereof, and a passageway formed in the walls of the valve body and communicating at one end with the interior of the cylinder and at is opposite end with the interior of the valve body at a point between the valve seat and the inlet, said piston adjacent its open end having an annular T-shaped groove formed therein receiving an O-ring for sealing engagement with the interior of the cylinder, said groove being in part defined by lips facing toward one another, and said groove being substantially wider than the diameter of the O-ring to allow rolling movement of the O-ring along the groove, and a passageway communicating the end of said groove nearest the open end of the piston with the fluid adjacent the open end of the piston.

5. A valve, comprising a valve body having an inlet and an outlet, a cylinder suspended within, in annular-spaced relation with respect to, and by the valve body, said cylinder having an open end opening toward and coaxially with the inlet and a blind end facing the outlet, a piston slidably fitting within the cylinder, said valve body having formed therein a circular valve seat axially spaced from the open end of and of the same diameter as the cylinder and disposed axially inwardly of the inlet of the valve body and adapted to slidably receive the piston to engage said seat, means for moving the piston from closed to open position and vice versa, said piston being open at the end adjacent the blind end of the cylinder and being closed at the end thereof closest the valve seat and having an outwardly opening pressure-responsive valve in the closed end thereof, and a passageway formed in the walls of the valve body and communicating at one end with the interior of the cylinder and at its opposite end with the interior of the valve body at a point between the valve seat and the inlet, and a valve in the passageway for regulating the flow of fluid therethrough, said piston adjacent its open end having an annular T-shaped groove formed therearound receiving an O-ring for sealing engagement with the interior of the cylinder.

6. A valve, comprising a valve body having an inlet and an outlet, a cylinder suspended within, in annular-spaced relation with respect to, and by the valve body, said cylinder having an open end opening toward and co-axial with the inlet and a blind end facing the outlet, a piston slidably fitting within the cylinder, said valve body having formed therein a circular valve seat axially spaced from the open end of and of the same diameter as the cylinder and disposed axially inwardly of the inlet of the valve body and adapted to slidably receive the piston to engage said seat, means for moving the piston from closed to open position and vice versa, said piston being open at the end adjacent the blind end of the cylinder and being closed at the end thereof closest the valve seat and having an outwardly opening pressure-responsive valve in the closed end thereof, and a passageway formed in the walls of the valve body and communicating at one end with the interior of the cylinder and at its opposite end with the interior of the valve body at a point between the valve seat and the inlet, and a valve in the passageway for regulating the flow of fluid therethrough, said piston adjacent its open end having an annular T-shaped groove formed therearound receiving an O-ring for sealing engagement with the interior of the cylinder, said groove being in part defined by lips facing toward one another and said groove being substantially wider than the diameter of the O-ring to allow rolling of the O-ring along the groove, and a passageway communicating the end of said groove nearest the open end of the piston with the fluid adjacent the open end of the piston.

References Cited in the file of this patent

UNITED STATES PATENTS

| | | |
|---|---|---|
| 132,523 | Cooper | Oct. 29, 1872 |
| 167,998 | Donnelly | Sept. 21, 1875 |
| 578,803 | Wood | Mar. 16, 1897 |
| 1,087,940 | Graham | Feb. 24, 1914 |
| 1,679,774 | Larner | Aug. 7, 1928 |
| 1,716,896 | Miller | June 11, 1929 |
| 2,266,485 | Williams | Dec. 16, 1941 |
| 2,404,547 | Strid | July 23, 1946 |
| 2,427,439 | Brown | Sept. 16, 1947 |
| 2,605,930 | McNeil | Aug. 5, 1952 |
| 2,621,885 | Schmitt | Dec. 16, 1952 |
| 2,704,650 | Rand | Mar. 22, 1955 |
| 2,713,989 | Bryant | July 26, 1955 |

FOREIGN PATENTS

| | | |
|---|---|---|
| 433 | Great Britain | of 1870 |
| 328,473 | France | of 1903 |